(12) United States Patent
Ohsawa

(10) Patent No.: US 8,863,706 B2
(45) Date of Patent: Oct. 21, 2014

(54) FOUR-STROKE CYCLE ENGINE

(71) Applicant: Suzuki Motor Corporation, Shizuoka (JP)

(72) Inventor: Hiroshi Ohsawa, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 6 days.

(21) Appl. No.: 13/654,737

(22) Filed: Oct. 18, 2012

(65) Prior Publication Data

US 2013/0112160 A1 May 9, 2013

(30) Foreign Application Priority Data

Nov. 8, 2011 (JP) .................................. 2011-244545

(51) Int. Cl.
| | |
|---|---|
| *F01L 9/02* | (2006.01) |
| *F16K 11/07* | (2006.01) |
| *F01L 1/06* | (2006.01) |
| *F01L 1/344* | (2006.01) |
| *F02B 75/18* | (2006.01) |

(52) U.S. Cl.
CPC ......... *F01L 9/02* (2013.01); *F01L 2001/34446* (2013.01); *F16K 11/07* (2013.01); *F02B 2075/1808* (2013.01); *F01L 1/06* (2013.01); *F01L 9/023* (2013.01)
USPC ..................................................... 123/90.12

(58) Field of Classification Search
CPC .............. F01L 9/02; F01L 9/023; F01L 9/025
See application file for complete search history.

(56) References Cited

U.S. PATENT DOCUMENTS

| | | | | |
|---|---|---|---|---|
| 4,174,687 A | * | 11/1979 | Fuhrmann | ................... 123/90.13 |
| 6,948,462 B2 | * | 9/2005 | Engelberg | ................... 123/90.12 |
| 2004/0103868 A1 | | 6/2004 | Engelberg | |
| 2005/0155566 A1 | | 7/2005 | Saretto et al. | |

FOREIGN PATENT DOCUMENTS

| | | |
|---|---|---|
| DE | 26 58 927 A1 | 7/1978 |
| DE | 101 55 669 A1 | 5/2003 |
| EP | 1 555 398 B1 | 2/2007 |
| JP | 2005-201259 A | 7/2005 |

OTHER PUBLICATIONS

Office Action mailed Aug. 28, 2013 in corresponding German Application No. 10 2012 219 851.2 with its English translation (14 pages).
German Office Action mailed Jan. 17, 2014 in corresponding DE Application No. 10 2012 219 851.2 (with an English Translation).

* cited by examiner

*Primary Examiner* — Thomas Denion
*Assistant Examiner* — Daniel Bernstein
(74) *Attorney, Agent, or Firm* — Rothwell, Figg, Ernst & Manbeck, P.C.

(57) ABSTRACT

There are output pistons 18 for opening intake valves 11, an intake cam 19 coaxial with a crankshaft 7 to actuate an input piston 22, a hydraulic control valve 20, output passageways 25A, 25B connecting the output pistons 18 to the hydraulic control valve, and an input passageway 24 connecting an input hydraulic chamber 21 to the hydraulic control valve. The hydraulic control valve has one state, which enables pressure-transmission communication between the input passageway and the output passageway 25A at least during a period for one cycle of reciprocating motion of the input piston 22, and another state, which enables pressure-transmission communication between the input passageway and the output passageway 25B at least during the period for one cycle of reciprocating motion of the input piston 22. The hydraulic control valve assumes the states alternately in every rotation of the intake cam 19.

3 Claims, 8 Drawing Sheets

FOUR-STROKE CYCLE ENGINE

RELATED APPLICATION

The present application claims priority to Japanese Patent Application No. 2011-244545 filed on Nov. 8, 2011, the entire content of which is being incorporated herein by reference.

TECHNICAL FIELD

The present invention relates to four-stroke cycle engines and more particularly to four-stroke cycle engines employing hydraulic valve actuation systems.

BACKGROUND ART

Four-stroke cycle engines, which operate on 720 degrees of crankshaft revolution and employ hydraulic valve actuation systems, are known. One such hydraulic valve actuation system is disclosed in Patent Literature 1 below, i.e. JP-A2005-201259 (=EP 1 555 398 B1 entitled "Internal combustion engine having a single camshaft which controls the exhaust valves mechanically, and the intake valves through an electronically controlled hydraulic device"). In this known system, the intake valves of the engine have the respective pumping pistons actuated by the respective cams of the single camshaft. Each of the pumping pistons transmits a thrust to a stem of the corresponding one of the intake valves to cause the opening of the intake valve against the action of a return spring by means of hydraulic fluid present in a pressure chamber and by means of a valve actuating piston.

PRIOR ART DOCUMENT

Patent Literature

Patent Literature 1: JP-A 2005-201259

The above-mentioned structure for the four-stroke cycle engines, however, poses a problem that a chain or a belt needed to drive a camshaft at a rate of one rotation per two revolutions of a crankshaft adds not only complexity and extra weight to the engines but also extra processes to manufacturing of them.

In view of the above problem, it is an object of the present invention to not only reduce weight of four-stroke cycle engines but also improve productivity of manufacture of them by simplifying their valve trains.

SUMMARY OF THE INVENTION

In accordance with one implementation of the present invention, there is provided a four-stroke cycle engine including:

a valve biased by a valve spring toward its closed position and a hydraulic actuating system including an output hydraulic chamber within a cylinder head, an output piston moveable backwards and forwards in the output hydraulic chamber for opening the valve against the valve spring, an input hydraulic chamber provided in the neighborhood of a crankshaft, an input piston moveable backwards and forwards in the input hydraulic chamber arranged for driving the output piston via hydraulic fluid, a cam coaxial with the crankshaft for actuating the input piston in a way that one rotation of the cam causes the input piston to move backwards and forwards once, a hydraulic control valve, an output passageway connecting the output hydraulic chamber to the hydraulic control valve, and an input passageway connecting the input hydraulic chamber to the hydraulic control valve, the hydraulic control valve having an output-enabling state, which enables pressure-transmission communication between the input passageway and the output passageway at least during a period for one cycle of reciprocating motion of the input piston beginning with the moment when, under action of the cam, the input piston begins to move from its rest position in a direction decreasing volume of the input hydraulic chamber and ending with the moment when the input piston subsequently returns to its rest position, and an output-disabling state, which disables the pressure-transmission communication at least during the period for one cycle of reciprocating motion of the input piston, the hydraulic control valve assuming one of the output-enabling state and the output-disabling state in every other rotation of the cam and the other in an adjacent rotation of the cam.

In the above stated implementation, it is possible to assume a state enabling pressure-transmission communication of an output passageway corresponding to one valve with an input passageway and a state disabling the pressure-transmission communication alternately. In addition, the above stated implementation encompass a case in which two output passageways are chosen in an alternative way to enter pressure-transmission communication with an input passageway. In other words, a possible arrangement is such that when one of the two output passageways is in pressure-transmission communication with the input passageway, the other is disabled from making pressure-transmission communication with the input passageway, and when the other of the two output passageways is in pressure-transmission communication with the input passageway, the one output passageway is disabled from making pressure-transmission communication with the input passageway.

For the above stated implementation, the four-stroke cycle engine further includes a pair of cylinders and a second valve biased by a second valve spring toward its closed position. Each of the first mentioned valve and the second valve is arranged on one of an inlet side and an outlet side of each of the cylinders of the pair. The hydraulic actuating system further includes a second output hydraulic chamber within the cylinder head, a second output piston moveable backwards and forwards in the second output hydraulic chamber for opening the second valve against the second valve spring, and a second output passageway connecting the second output hydraulic chamber to the hydraulic control valve. The hydraulic control valve puts one of the first mentioned output passageway and the second output passageway in pressure-transmission communication with the input passageway in every other rotation of the cam and the other in pressure-transmission communication with the input passageway in an adjacent rotation of the cam.

For the above stated implementation, the four-stroke cycle engine further includes a second valve biased by a second valve spring toward its closed position. The first mentioned valve and the second valve are an intake valve and an exhaust valve. The hydraulic actuating system includes a first hydraulic actuating subsystem for controlling the intake valve and a second hydraulic actuating subsystem for controlling the exhaust valve.

For the above stated implementation, the four-stroke cycle engine further includes a second valve biased by a second valve spring toward its closed position. The first mentioned valve and the second valve are an intake valve and an exhaust valve. The hydraulic actuating system includes a first hydraulic actuating subsystem for controlling the intake valve and a second hydraulic actuating subsystem for controlling the exhaust valve. The hydraulic actuating system includes a second cam. The first mentioned cam and the second cam are an intake cam for an input to the hydraulic actuating subsystem for controlling the intake valve and an exhaust cam for an input to the hydraulic actuating subsystem for controlling the exhaust valve. The intake cam and the exhaust cam are coaxial with the crankshaft.

For the above stated implementation, the output passageway is allowed to communicate with an oil pump when the output oil passageway is disabled from making pressure-transmission communication with the input passageway.

For the above stated implementation, the hydraulic control valve has a solenoid, a cylinder portion and a spool actuated by the solenoid to move backwards and forwards in the cylinder portion. The spool has a state in which the spool is arranged to assume a position that enables pressure-transmission communication between the input passageway and the output passageway at least during a period for one cycle of reciprocating motion of the input piston beginning with the moment when, under action of the cam, the input piston begins to move from its rest position in a direction decreasing volume of the input hydraulic chamber and ending with the moment when the input piston subsequently returns to its rest position. The spool has also a state in which the spool is arranged to assume a position that disables the pressure-transmission communication at least during the period for one cycle of reciprocating motion of the input piston. The spool assumes one of the above-mentioned two states in every other rotation of the cam and the other in an adjacent rotation of the cam.

For the above stated implementation, the four-stroke cycle engine further includes a pair of cylinders and a second valve biased by a second valve spring toward its closed position. Each of the first mentioned valve and the second valve is arranged on one of an inlet side and an outlet side of each of the cylinders of the pair. The hydraulic actuating system further includes a second output hydraulic chamber within the cylinder head, a second output piston moveable backwards and forwards in the second output hydraulic chamber for opening the second valve against the second valve spring, and a second output passageway connecting the second output hydraulic chamber to the hydraulic control valve. The hydraulic control valve puts one of the first mentioned output passageway and the second output passageway in pressure-transmission communication with the input passageway in every other rotation of the cam and the other in pressure-transmission communication with the input passageway in an adjacent rotation of the cam. The hydraulic control valve has a solenoid, a cylinder portion and a spool actuated by the solenoid to move backwards and forwards in the cylinder portion. The spool has a state in which the spool is arranged to assume a position that enables pressure-transmission communication between the input passageway and one of the first mentioned and second output passageways at least during a period for one cycle of reciprocating motion of the input piston beginning with the moment when, under action of the cam, the input piston begins to move from its rest position in a direction decreasing volume of the input hydraulic chamber and ending with the moment when the input piston subsequently returns to its rest position. The spool has also a state in which the spool is arranged to assume a position that enables pressure-transmission communication between the input passageway and the other of said first mentioned and second output passageways at least during the period for one cycle of reciprocating motion of the input piston. The spool assumes one of the above mentioned two states in every other rotation of the cam and the other in an adjacent rotation of the cam.

For the above stated implementation, the valve has its valve stem axis slanted with respect to a first imaginary plane including a cylinder center line of a cylinder bore and an axis of the crankshaft and also slanted with respect to a second imaginary plane including the cylinder center line of the cylinder bore and orthogonal to the first imaginary plane.

For the above stated implementation, the hydraulic actuating system is formed inside walls of a monoblock where the cylinder head and a cylinder block share the same casting.

The present invention provides an improvement in productivity of manufacture of four-cycle engines in addition to reduction in weight of them by simplifying their valve trains.

DESCRIPTION OF IMPLEMENTATIONS

Figure 1:
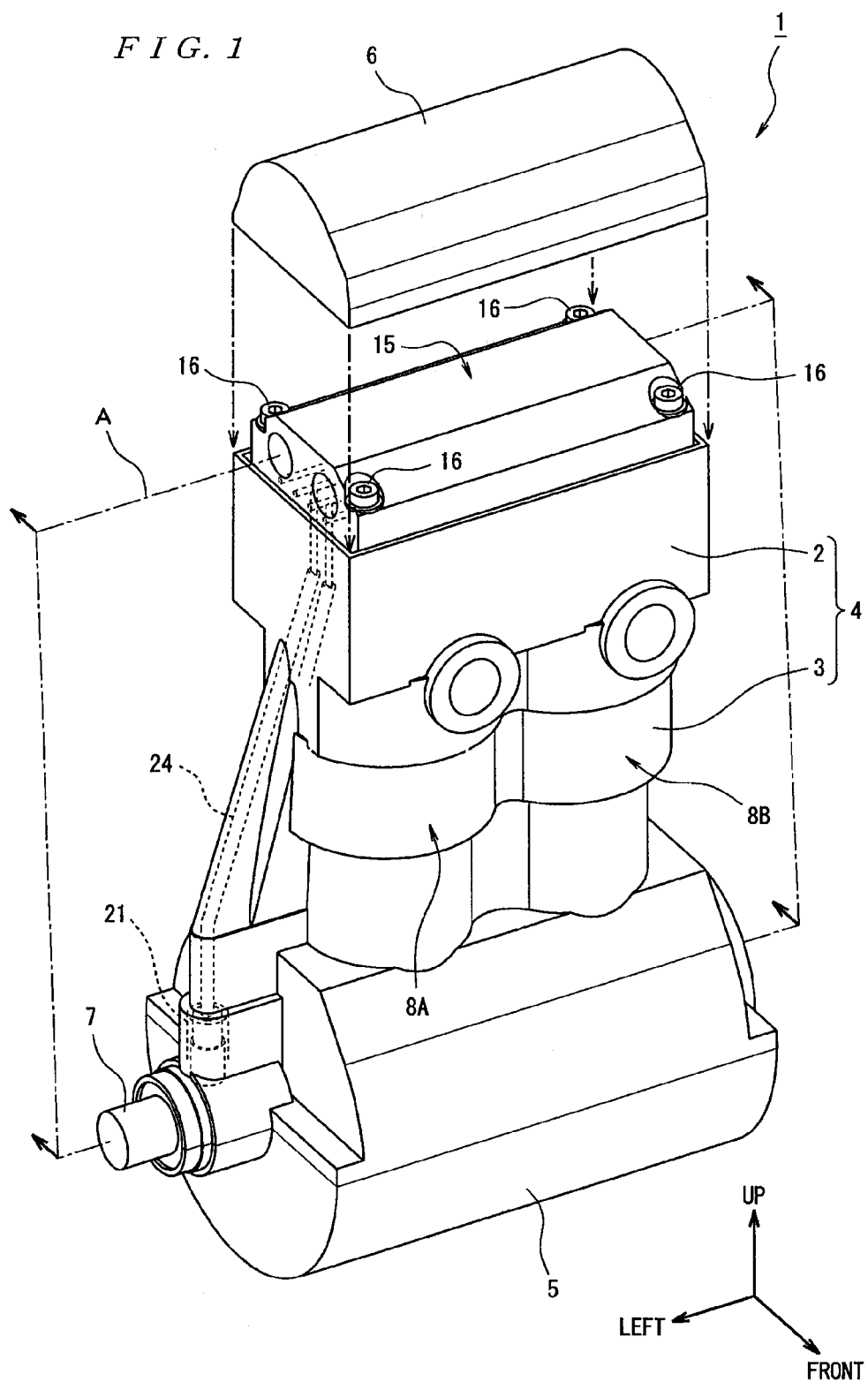
FIG. 1 is a perspective view of a four-stroke cycle engine with a head cover removed according to a first embodiment of the present invention

Referring to the drawings, implementations of a four-stroke cycle engine according to the present invention are described below. It should be noted, however, that the drawings include the pattern diagram of the four-stroke cycle engine and the dimensions of and the ratio in dimension of all components do not consistent with reality. The dimensions of and the ratio in dimension of all of illustrated components may not consistent throughout all of the drawings.

[First Implementation]

FIGS. 1 to 5 show a four-stroke cycle engine (hereinafter referred to an engine) 1 according to the first implementation of the present invention.

(Schematic Configuration of Engine)

Referring to FIG. 1, the engine 1 according to the present implementation includes a monoblock 4 where a cylinder head portion 2, a cylinder block portion 3 and an upper crankcase share the same casting. The monoblock 4 is formed with a pair of in-line cylinders 8A and 8B (only the cylinder outer peripheries being shown in FIG. 1). Fixed to the bottom of the monoblock 4 is a lower crankcase 5. Capping the cylinder head portion 2 is a head cover 6. A crankshaft 7 is supported between the lower portion of the upper crankcase of the monoblock 4 and the lower crankcase 5 in such a way that one and the opposite end portions of the crankshaft 7 protrude from the left and right end faces of the lower portion of the monoblock 4 and the lower crankcase 5, which end faces are spaced in a longitudinal direction (as indicated by an arrow to the left in FIG. 1).

Figure 2:
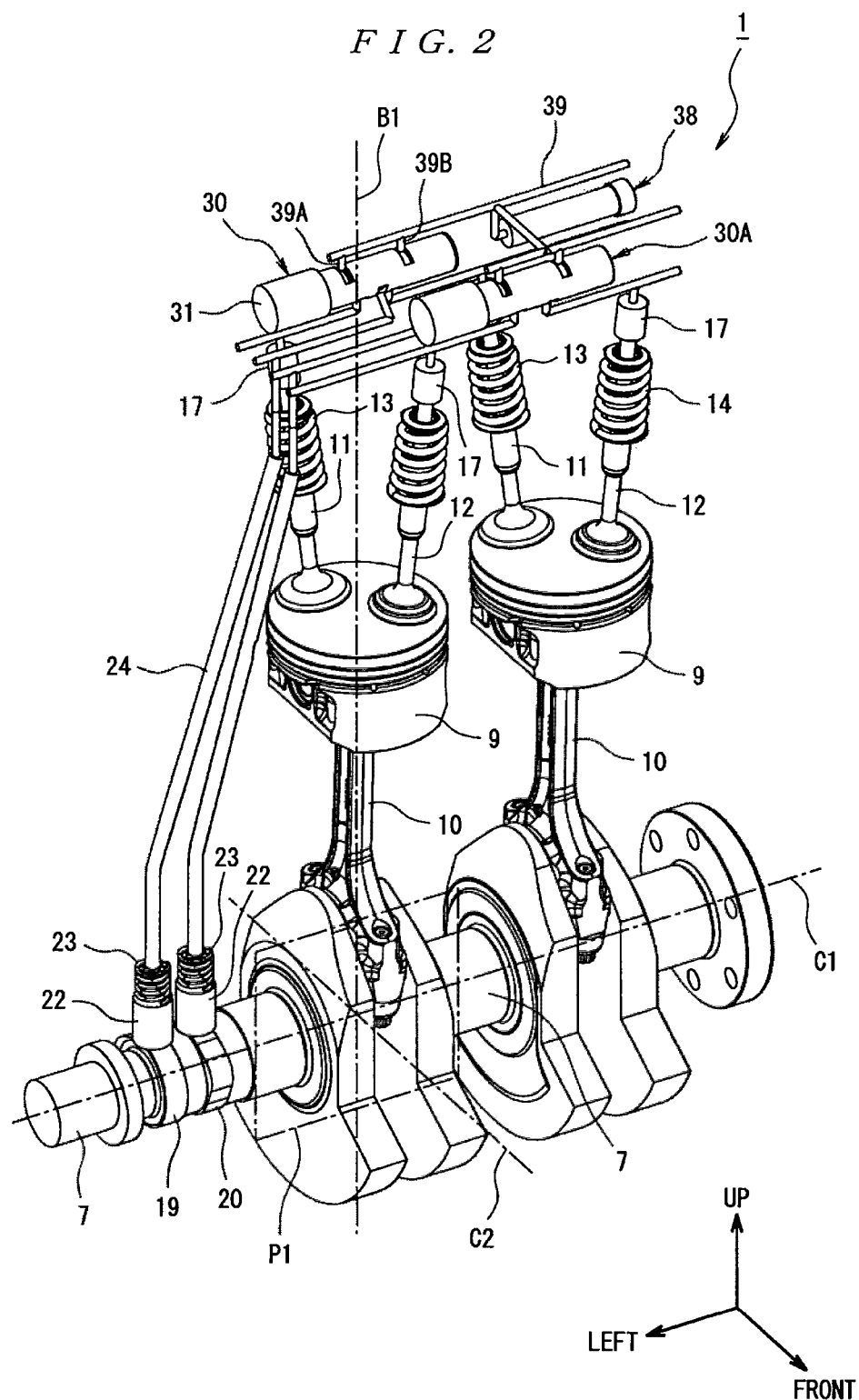
FIG. 2 is a perspective view of parts of the four-stroke cycle engine according to the first embodiment of the present invention, showing the relation among a hydraulic actuating system, intake/exhaust valves, a crankshaft and a piston.

Referring also to FIG. 2, in the engine 1, reciprocating pistons 9 moving up and down in their respective cylinders 8A and 8B (see also FIGS. 1 and 3) are connected to the crankshaft 7 by connecting rods 10 to convert reciprocating movement of each piston 9 to a rotary movement.

Intake valves 11 and exhaust valves 12 are arranged on the cylinder head portion 2 of the monoblock 4 at their respective positions above the corresponding cylinders 8A and 8B to open or close openings communicating with intake and exhaust ports, not shown. Valve springs 13 bias the intake valves 11 toward their closed positions. Valve springs 14 bias the exhaust valves 12 toward their closed positions.

Figure 4:
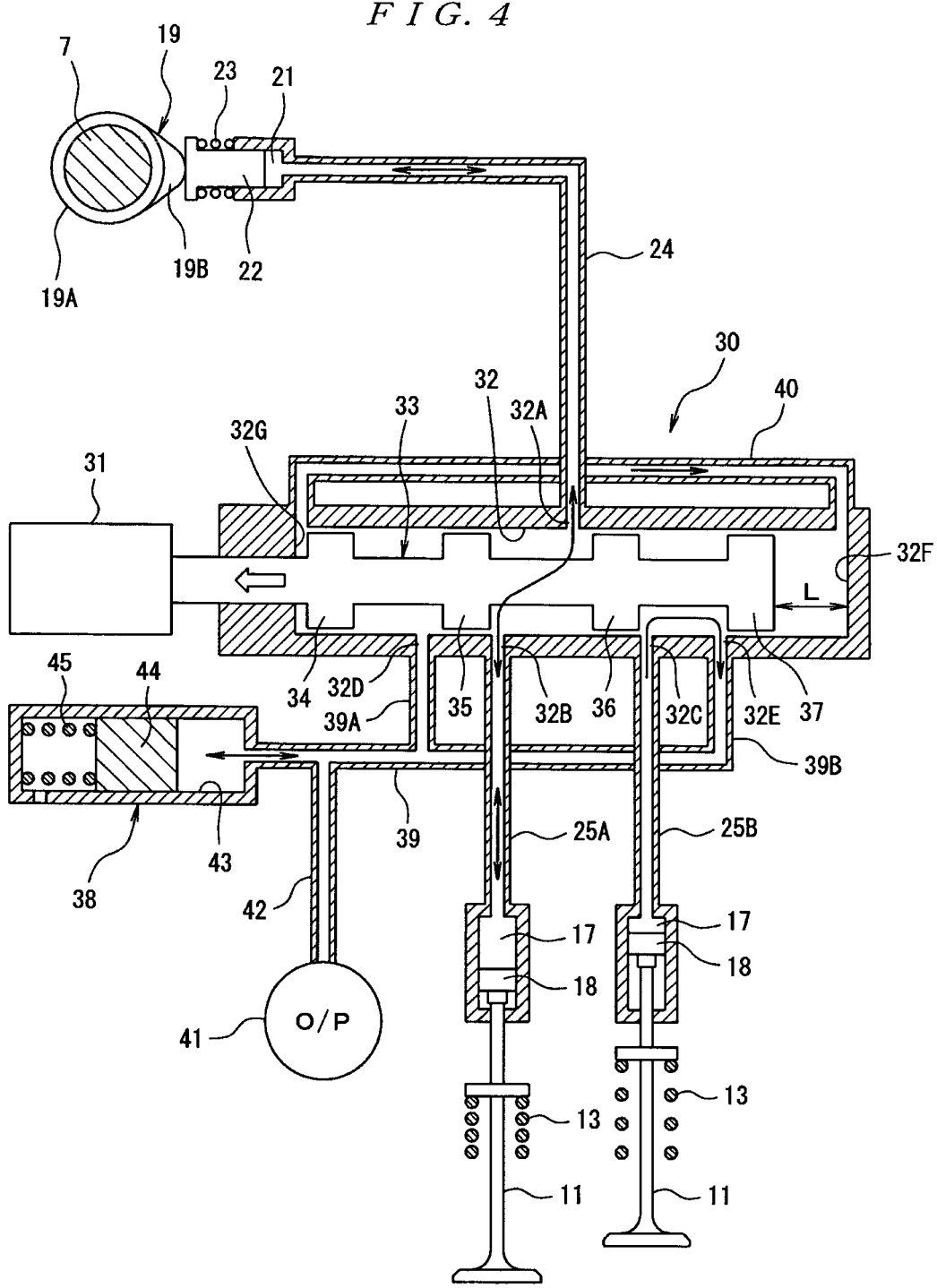
FIG. 4 is a schematic sectional diagram showing an operating position (or a position for selecting a first cylinder) assumed by the hydraulic actuating system of the four-stroke cycle engine according to the first embodiment of the present invention.
Figure 5:
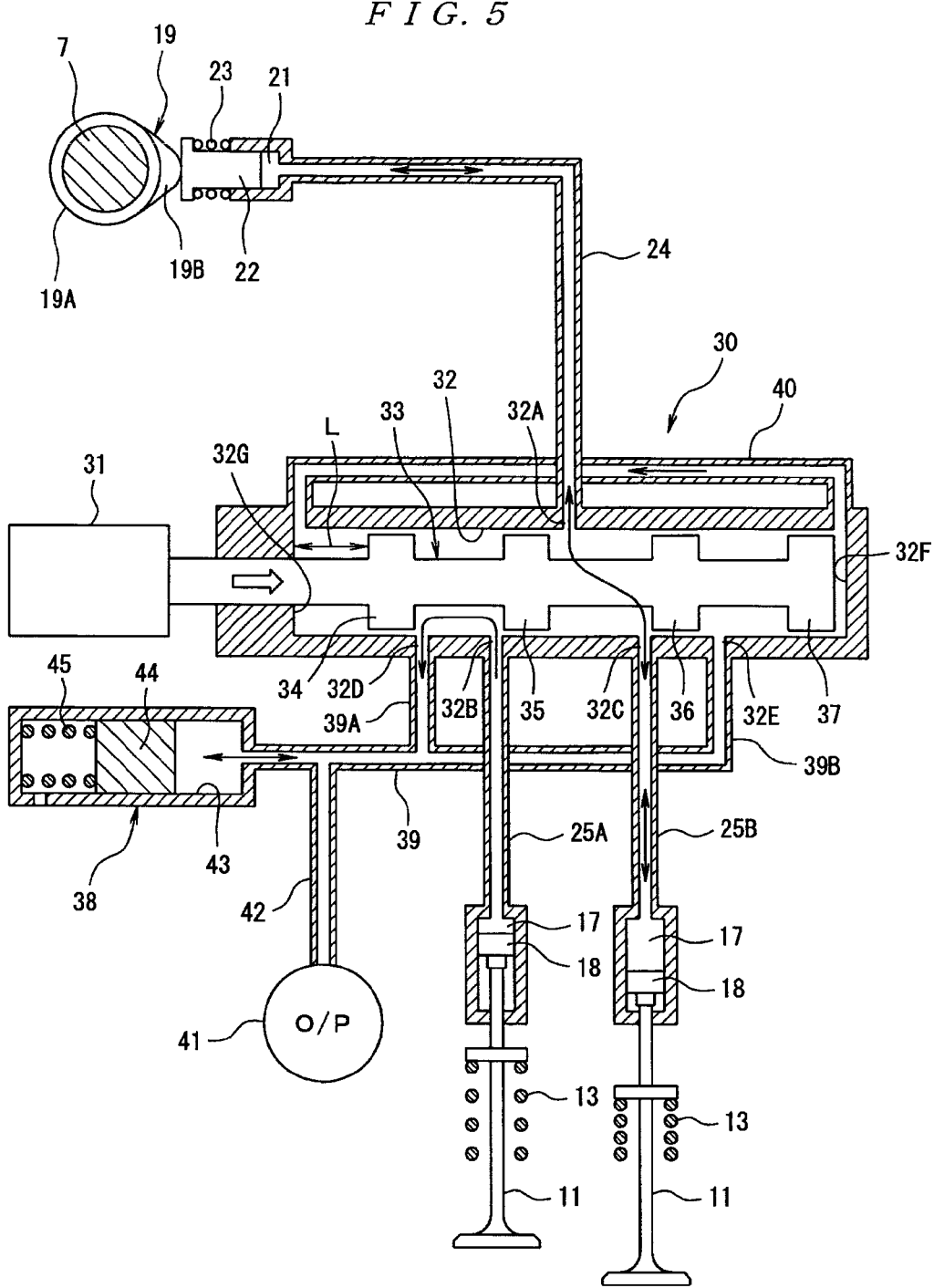
FIG. 5 is a schematic sectional diagram showing another operating position (or a position for selecting a second cylinder) assumed by the hydraulic actuating system of the four-stroke cycle engine according to the first embodiment of the present invention.

With continuing reference to FIG. 2, the engine 1 has a hydraulic actuating system (17, 22, 19, 20, 30, 30A, 38) for the intake valves 11 and the exhaust valves 12. The hydraulic actuating system is dividable into and includes an intake valve actuating subsystem for the intake valves 11 and an exhaust valve actuating subsystem for the exhaust valves 12. Referring also to FIGS. 4 and 5, the intake valve actuating subsystem includes hydraulically operable valve actuating or output pistons 18 for opening or closing the respective intake valves 11, a cam operated input piston 22 for causing an hydraulic input, an intake cam 19 coaxial with the crankshaft 7 for operating the input piston 22 to thrust same to cause the hydraulic input, and a hydraulic control valve 30.

In the following description, the hydraulic actuating subsystem for the intake valves 11 is mainly described because the hydraulic actuating subsystem for the exhaust valves 12 is substantially the same as the hydraulic actuating subsystem for the intake valves 11. Thus, like reference numerals are used to denote like or similar parts or portions throughout the hydraulic actuating subsystem for the intake valves 11 and the hydraulic actuating subsystem for the exhaust valves 12, and the detailed description of the hydraulic actuating subsystem for the exhaust valves 12 is hereby omitted for the sake of simplicity.

The hydraulic control valve 30, which is later described in detail with reference to FIGS. 4 and 5, is a directional control valve to select the following two actions alternately in every rotation of the intake cam 19. In other words, the hydraulic control valve 30 selects one of the following two actions in every other rotation of the intake cam 19 and the other action in an adjacent rotation of the intake cam 19. One of the two actions provides a positive motion connection between the intake cam 19 and one of the intake valves 11 during at least a period for one cycle of reciprocating motion of the input piston 22 by opening a hydraulic passageway to hold hydraulic connection between the input piston 22 and one of the output pistons 18 to open and then close the intake valve 11 following the intake cam 19. The other action provides a lost motion connection between the intake cam 19 and the intake valve 11 during at least a period for one cycle of reciprocating motion of the input piston 22 by closing the hydraulic passageway to interrupt the hydraulic connection between the input piston 22 and the output piston 18 to keep the intake valve 11 closed. From the preceding, it is seen that the hydraulic control valve 30 is configured to select one of above-mentioned two actions in every other rotation of the intake cam 19 and the other action in an adjacent rotation of the intake cam 19.

Figure 3:
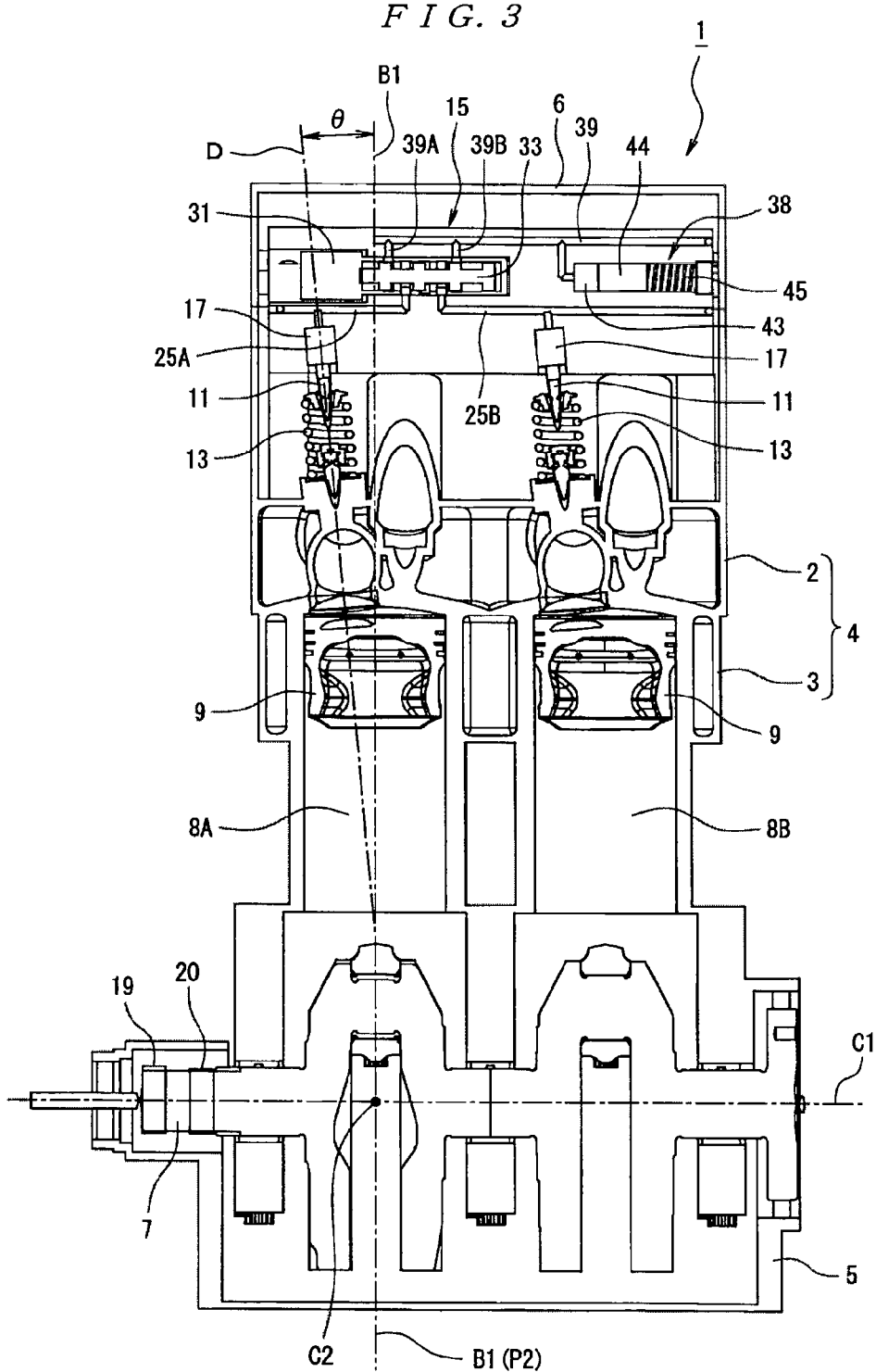
FIG. 3 is a sectional view of the four-stroke cycle engine cutting through a plane A in FIG. 1.

In order to provide an ideal semispherical combustion chamber for combustion in each of the cylinders 8A and 8B by increasing valve opening areas for efficiency in intake/exhaust function and proper flow of fuel-air mixture in the cylinder bore, the intake valves 11 and exhaust valves 12 are arranged as follows: Referring to FIGS. 2 and 3, each of the intake valves 11 has its valve stem axis D (see FIG. 3) slanted with respect to orthogonal first and second imaginary planes P1 and P2. The first imaginary plane P1 includes a cylinder center line B1 of the cylinder bore and an axis C1 of the crankshaft 7 and the second imaginary plane P2 includes the cylinder center line B1 and an axis C2 orthogonal to the crankshaft axis C1. As viewed in FIG. 3, the slanted valve stem axis D is set at an angle θ with respect to the second imaginary plane P2. Each of the exhaust valves 12 has its valve stem axis slanted with respect to the orthogonal first and second imaginary planes P1 and P2 in the same manner as the intake valve 11.

(Construction of Hydraulic Actuating System)

Referring to FIG. 1, a hydraulic actuating unit 15 is placed on and fixed to the cylinder head portion 2 by means of bolts 16. The hydraulic actuating unit 15 cooperates with the cylinder head portion 2 to form a cylinder head. As best seen in FIG. 3, the hydraulic actuating unit 15 is formed with output hydraulic chambers 17. The output hydraulic chambers 17 are represented by cylindrical bodies throughout FIGS. 2 to 5 for convenience of illustration, but actually the output hydraulic chambers 17 are hollow structures formed inwards the block of the hydraulic actuating unit 15 and filled with hydraulic fluid in the form of engine oil.

Referring to FIGS. 4 and 5, each of the output pistons 18 is provided for reciprocating motion in one of the output hydraulic chambers 17. The output piston 18 is arranged in such a way that its central axis is in alignment with a central axis of the corresponding one of the intake valves 11. This output piston 18 is provided to open the intake valve 11 against the valve spring 13. In the present implementation, at its top end, each of the intake valves 11 is kept in contact with one of the output pistons 18 by the valve spring 13.

As best seen FIGS. 2 and 3, the crankshaft 7 fixedly carries not only the intake cam 19 but also an exhaust cam 20. The intake and exhaust cams 19 and 20 are coaxially coupled to a portion in the neighborhood of one end of the crankshaft 7. The intake cam 19 provides an input to the hydraulic actuating subsystem for the intake valves 11. The exhaust cam 20 provides an input to the hydraulic actuating subsystem for the exhaust valves 12.

Referring to FIGS. 4 and 5, the input hydraulic chamber 21 is set at a position facing the intake cam 19. The input hydraulic chamber 21 is represented by an internal space of a cylinder for convenience of illustration throughout FIGS. 4 and 5, but actually the input hydraulic chamber 21 is a hollow space formed inwards the monoblock 4 (see also FIG. 1).

With continuing reference to FIGS. 4 and 5, the input piston 22 is received for smooth reciprocating motion in the input hydraulic chamber 21, but it is always kept in contact with the cam surface (periphery) of the intake cam 19 under the bias of a spring 23 so that it moves back and forth one time per one rotation of the intake cam 19. The cam surface of the intake cam 19 includes a base circle 19A and a cam lobe 19B in the profile of a protruding nose. Referring also to FIG. 2, each spring 23 biases the corresponding one of the input pistons 22 to keep it in contact with one of the intake and exhaust cams 19 and 20. Thus, the input piston 22 in contact with the intake cam 19 may be called an intake cam follower, and the input piston in contact with the exhaust cam 20 an exhaust cam follower.

Next, the hydraulic control valve 30 is explained. The hydraulic control valve 30 is included in the hydraulic actuating unit 15. As shown in FIGS. 4 and 5, the hydraulic control valve 30 has a solenoid 31, a cylinder portion 32 filled with engine oil and a spool 33 that is received in the cylinder portion 32. The solenoid 31 moves the spool 33 back and forth in the cylinder portion 32. Actually, the cylinder portion 32 is a hollow space, with which a block constituting the hydraulic actuating unit 15 is formed.

As best seen in FIGS. 4 and 5, this hydraulic control valve 30 is connected in a way that its port 32A located in almost the middle position between two axially spaced ends of the cylinder portion 32 communicates with the input hydraulic chamber 21 through an input passageway 24. The hydraulic control valve 30 is connected in a way that its ports 32B and 32C communicate with the corresponding output hydraulic chamber 17 to the first cylinder 8A and the corresponding output hydraulic chamber 17 to the second cylinder 8B, respectively, (see also FIG. 1 and FIG. 2) through the respective output passageways 25A and 25B. The ports 32B and 32C are formed at such axially spaced positions of the cylinder portion 32 as to interpose the above-mentioned port 32A. Ports 32D and 32E are formed at positions on both sides of the ports 32B and 32C, that is, one position in the neighborhood of the port 32B and spaced axially, with respect to the cylinder portion 32, from the port 32A further than the port 32B is and the other position in the neighborhood of the port 32C and spaced axially from the port 32A further than the port 32C is. The ports 32D and 32E are connected to passageways 39A and 39B, respectively.

As readily seen in FIGS. 4 and 5, the spool 33 is in the form of a rod. The spool 33 is formed with lands 34, 35, 36 and 37 of the same diameter. The lands 34, 35, 36 and 37 are arranged at predetermined intervals and in this order from the side of the solenoid 31. The land 37 is in a distal end region of the spool 33. In a first or rest state illustrated in FIG. 4 in which the spool 33 has been pulled back by the solenoid 31 (the state in which the spool 33 has moved to the left viewing in FIG. 4), a space defined by a port recess between the lands 34 and 35 is allowed to communicate with the port 32D that is connected to the passageway 39A, a space defined by a port recess between the lands 35 and 36 is allowed to communicate with the port 32A that is connected to the input passageway 24 and also with the port 32B that is connected to the output passageway 25A for the first cylinder 8A, and a space defined by a port recess between the lands 36 and 37 is allowed to communicate with the port 32C that is connected to the output passageway 25B for the second cylinder 8B and also with the port 32E that is connected to the passageway 39B. In this state, a distance L between the land 37 and the end 32F of the cylinder portion 32 becomes the length of the stroke of the spool 33.

In a second or protruding state illustrated in FIG. 5 in which the spool 33 has been thrust by the solenoid 31 to protrude into the cylinder portion 32 (the state in which the spool 33 has moved to the right viewing in FIG. 5), the space defined by the port recess between the lands 34 and 35 provides communication between the port 32B that is connected to the output passageway 25A for the first cylinder 8A and the port 32D that is connected to the passageway 39A, the space defined by the port recess between the lands 35 and 36 is allowed to communicate with the port 32A that is connected to the input passageway 24 and also with the port 32C that is connected to the output passageway 25B for the second cylinder 8B, and the space defined by the port recess between the lands 36 and 37 is allowed to communicate with the port 32E that is connected to the passageway 39B. In this state, a distance between the land 34 and the end 32G of the cylinder portion 32 on the side of the solenoid 31 becomes the length L. In order to ensure smooth reciprocating motion of the spool 33 within the cylinder portion 32, a passageway 40 provides communication between the adjacent space to the end 32F of the cylinder portion 32 and the adjacent space to the end 32G of the cylinder portion 32.

The solenoid 31 is controlled so that the spool 33 assumes one of the two positions illustrated in FIGS. 4 and 5 in every other rotation of the intake cam 19 and the other in an adjacent rotation of the intake cam 19. In other words, the hydraulic control valve 30 assumes one of the first and second states in every other rotation of the intake cam 19 and the other in an adjacent rotation of the intake cam 19. In the first state, the spool 33 is kept at the position (the illustrated position in FIG. 4) to allow hydraulic pressure-transmission communication between the input passageway 24 and the output passageway 25A for the first cylinder 8A during at least one two-stroke cycle of the input piston 22. In the second state, the spool 33 is kept at the position (the illustrated position in FIG. 5) to allow hydraulic pressure-transmission communication between the input passageway 24 and the output passageway 25B for the second cylinder 8B during at least one two-stroke cycle of the input piston 22. The two-stroke cycle of the input piston 22 begins with the moment when the input piston 22 begins to move in a direction reducing the volume of the input hydraulic chamber 21 (i.e. in a direction toward the input passageway 24) and ends with the moment when the input piston 22 returns to its rest position.

The passageways 39A and 39B loin each other to form a passageway 39 and they are connected to an accumulator 38 through the passageway 39. An engine oil pump 41 is connected to the passageway 39 through a passageway 42. Therefore, pressure in the passageways 39, 39A and 39B is kept almost as high as pressure of engine oil in the passageway 42.

The accumulator 38 includes an accumulator chamber 43, an accumulator piston 44 received in the accumulator chamber 43 for reciprocating motion and a spring 45 biasing the accumulator piston 44 in a direction toward the passageway 39. The above stated input hydraulic chamber 21, input passageway 24, hydraulic control valve 30, output passageways 25A, 25B, output hydraulic chamber 17, passageways 39, 39A, 39B, 42, and accumulating chamber 43 are filled with engine oil. The spring 45 is less, in spring constant, than each of the valve springs 13 of the intake valves 11. This ensures that each of the intake valves 11 is completely closed when the corresponding one of the output passageways 25A and 25B is allowed to communicate with the passageway 39.

(Operation and Effect)

Next, description of operation of the engine 1 follows. When the intake valve 11 for the first cylinder 8A is to be lifted, the spool 33 of the hydraulic control valve 30 is pulled by the solenoid 31 to the illustrated position of FIG. 4 in which the land 34 is in the neighborhood of the end 32G of the cylinder portion 32. The spool 33 keeps this position during the period of time when the intake cam 19 begins to make one rotation with bringing the base circle 19A into contact with the input piston 22 before the cam lobe 19B and ends the rotation with bringing the base circle 19A again into contact with the input piston 22 after the cam lobe 19B.

Figure 6:
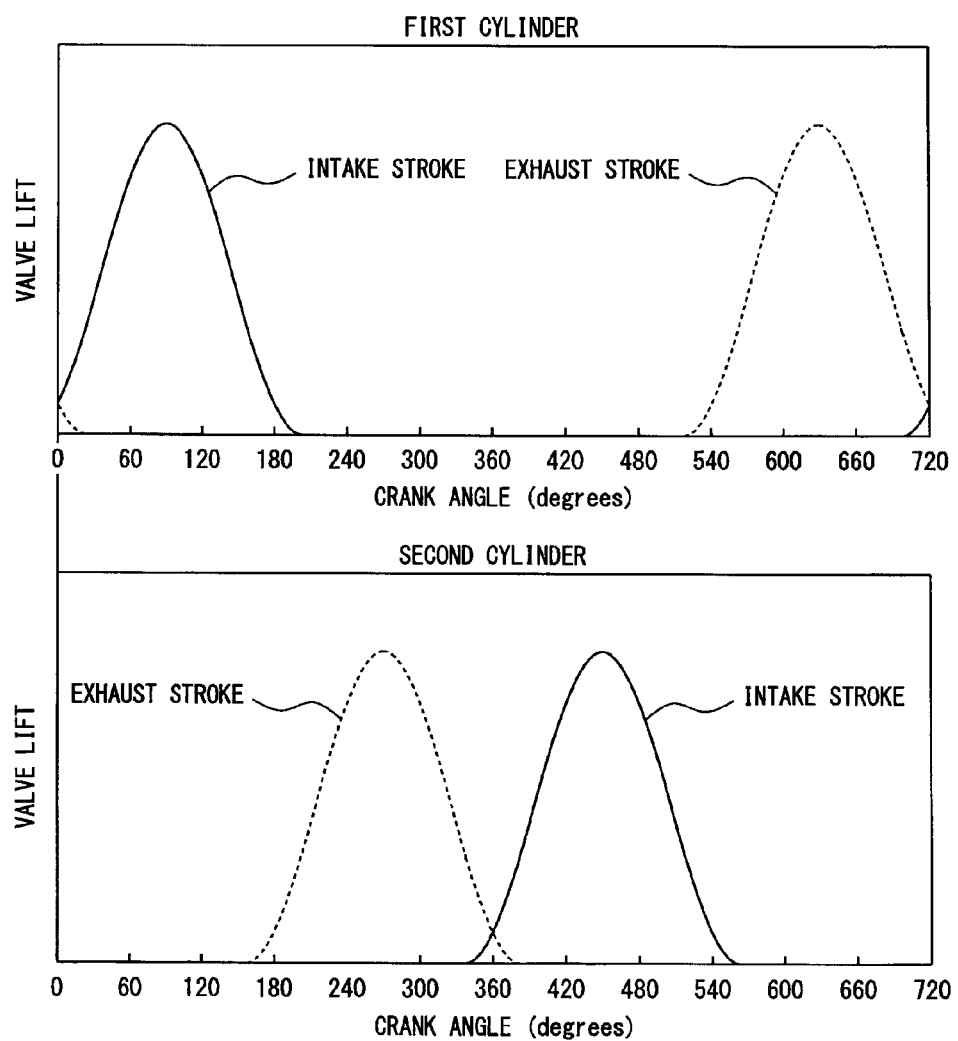
FIG. 6 is a graphical representation showing the relation between valve lift and crankshaft angle for the first and second cylinder of the four-stroke cycle engine according to the first embodiment of the present invention.

In the position illustrated in FIG. 4, the ports 32A and 32B communicate with each other, and the ports 32C and 32E communicate with each other. In this position, hydraulic thrust caused by movement of the input piston 22 actuated by the intake cam 19 is transmitted through the input hydraulic chamber 21, intake passageway 24, cylinder portion 32, output passageway 25A and output hydraulic chamber 17 to thrust the output piston 18, thereby to lift the intake valve 11 of the first cylinder 8A open once (see, intake stroke of the first cylinder 8A shown in FIG. 6). The timing of opening of the exhaust valve 12 of the first cylinder 8A is determined by another hydraulic control valve 30A shown in FIG. 2 based on the timing of the intake valve 11 under the control of the hydraulic control valve 30.

The other intake valve 11 arranged at an inlet opening of the neighboring second cylinder 8B is closed as shown in FIG. 4. Then, the pressure in the output hydraulic chamber 17 for the intake valve 11 of the second cylinder 8B is kept relatively low because the output hydraulic passageway 25B communicates with the passageway 39B via the cylinder portion 32.

During the period (360° to 720° in crank angle degrees) when the intake cam 19 makes the next rotation, the spool 33 of the hydraulic control valve 30 is thrust by the solenoid 31 to the illustrated position in FIG. 5 in which the land 37 is in the neighborhood of the end 32F of the cylinder portion 32. During this period, the intake valve 11 of the first cylinder 8A is kept closed as shown in FIG. 5 because the piston 9 in the first cylinder 8A is in an expansion stroke and an exhaust stroke. During this period, the intake valve 11 of the second cylinder 8B is lifted to open once in a similar way the intake valve 11 of the first cylinder 8A is lifted open as stated above (see, intake stroke of the second cylinder 83 shown in FIG. 6) because the ports 32A and 32C communicate with each other. Similarly to the exhaust valve 12 of the first cylinder 8A, the timing of the exhaust valve 12 of the second cylinder 8B is determined by another hydraulic control valve 30A shown in FIG. 2 based on the timing of the intake valve 11.

As the preceding description clarifies, each of the intake valves 11 of the first and second cylinders 8A and 83 is lifted at the regular interval of 720° in crank angle degrees only by selecting one of the two positions of the spool 33 of the hydraulic control valve 30 in every other rotation of the intake cam 19 and selecting the other position in an adjacent rotation of the intake cam 19. Each of the input hydraulic chambers 17 of the first and second cylinders is connected to the accumulator 38 through the passageway 39 when the communication of the output hydraulic chamber 17 with input passageway 24 is interrupted. Since the oil passage 39 is connected to the oil pump 41, a steady supply of engine oil to the hydraulic actuating system as the need arises is ensured, providing proper operation of the intake valves 11 and exhaust valves 12 without any delay.

As previously stated, the first and second cylinders 8A and 8B of the engine 1 share a valve lift thrust given by the intake cam 19 in every revolution of the crankshaft 7 only by advancing the spool 33 of the hydraulic control valve 30 in an axial direction in every other revolution of the crankshaft 7 and retreating the spool 33 in the opposite axial direction in an adjacent revolution of the crankshaft 7. The intake valve 11 of one of the cylinders 8A and 8B is given a valve lift thrust once in, two revolutions of the crankshaft 7, thus providing the same operation as operation given by using the conventional camshaft which makes one rotation per two revolutions of the crankshaft 7.

From the preceding description of the engine 1, it is advantageous that the hydraulic control valve 30 does not require any special timing accuracy because on/off control of the solenoid 31 coupled to the spool 33 may be carried out any desired timing when the base circle portion 19A of the intake cam 19 is in contact with the input piston 22 (i.e. when there is no valve lift).

According to the engine 1, the hydraulic control valve 30 allows at least two output pistons 18 to share the same single input piston 22, making contribution to a reduction in number of input pistons 22, simplifying, in structure, the valve actuating system, leading to a reduction in weight of and an improvement in productivity of manufacture of engine 1.

According to the engine 1, the cylinder head portion 2 and the cylinder block portion 3 share the monoblock 4 and become integrated. This allows integration of hydraulic passages by drilling through the monoblock 4 to form an input hydraulic chamber 21, an input passageway 24, a cylinder portion 32, output passageways 25A, 25B, passageways 39, 39A, 39B, 42, an accumulator chamber 43 and so on. Accordingly, there is a considerable reduction, in number, of hydraulic seals because of a reduction, in number, of interfaces among separable engine parts.

The present implementation has realized an ideal semispherical combustion chamber for combustion without adding any complicated mechanism and machine work to a valve actuating mechanism because, as shown in FIGS. 2 and 3, each of intake valves 11 has its valve stem axis D slanted with respect to a first imaginary plane P1 including a cylinder center line 31 of the cylinder bore and an axis C1 of the crankshaft 7 and slanted with respect to a second imaginary plane P2 including the cylinder center line 31 of the cylinder bore and orthogonal to the first imaginary plane P1. Realization of a semispherical combustion chamber in a conventional engine of the type using a camshaft to lift valves is actually very difficult because of additional new rocker arms or diagonal machining of cam surfaces. Accordingly, this embodiment can realize a reduction in weight of engine 1 and an improvement, in productivity, of manufacture and avoid the complication, in structure, of valve driving system by slanting the intake valves 11 and exhaust valves 12 at free angles with respect to both of the above-mentioned first and second planes P1 and P2.

[Second Implementation]

Figure 7:
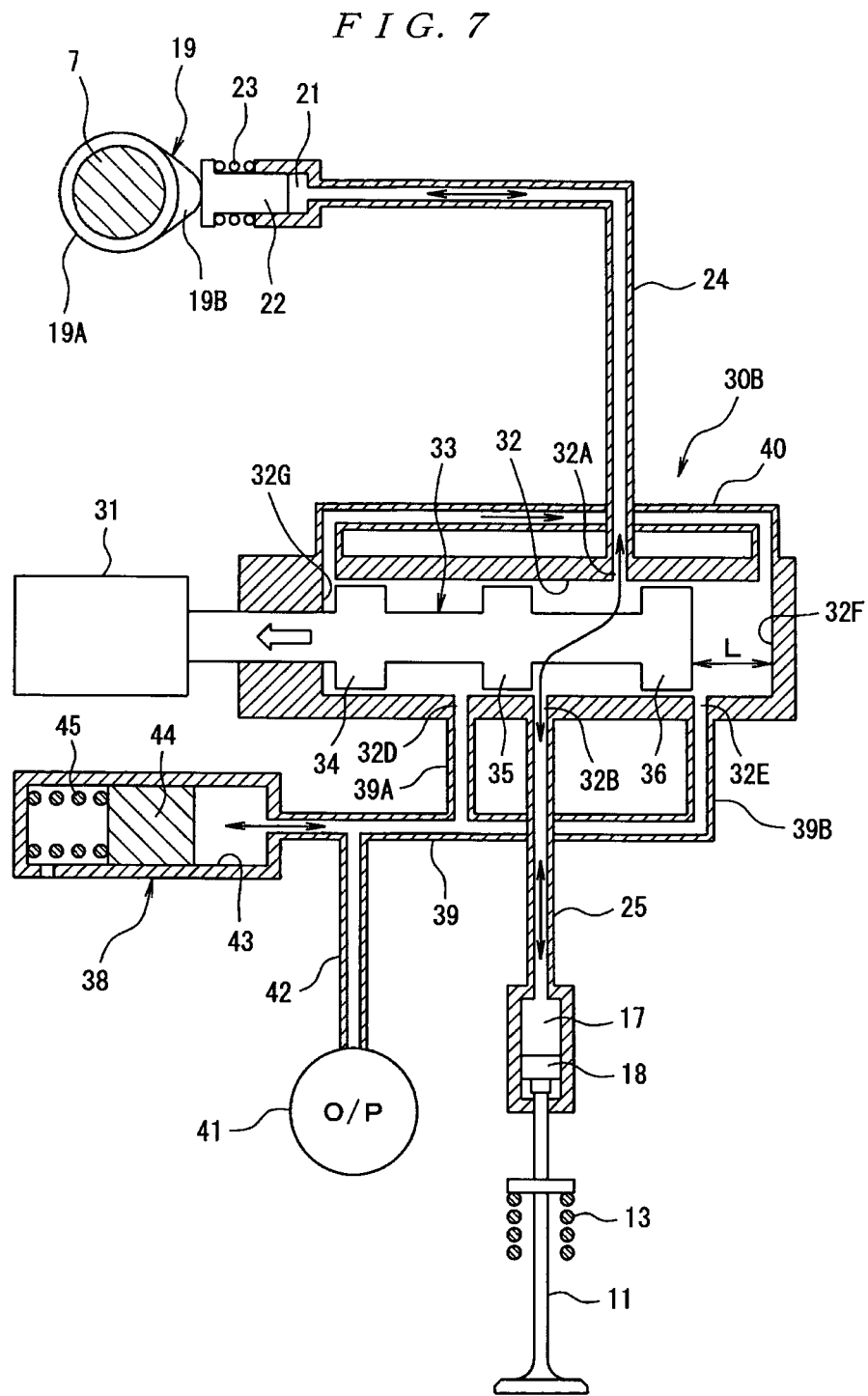
FIG. 7 is a schematic sectional diagram showing an operating position (or a valve's open position) assumed by a hydraulic actuating system of a four-stroke cycle engine according to a second embodiment of the present invention.
Figure 8:
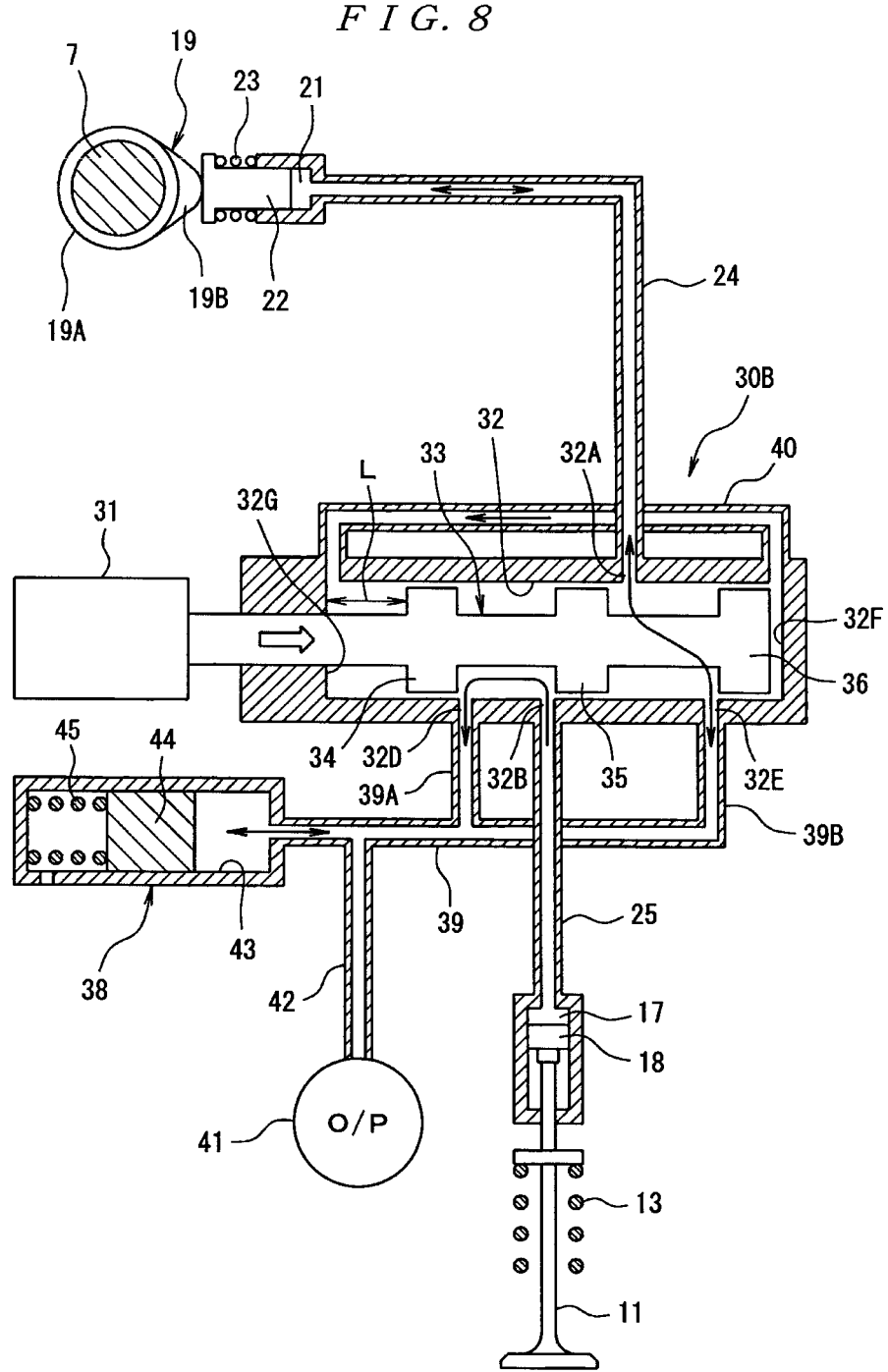
FIG. 8 is a schematic sectional diagram showing another operating position (or a valve's closed position) assumed by the hydraulic actuating system of the four-stroke cycle engine according to the second embodiment of the present invention.

Referring to FIGS. 7 and 8, there is shown a hydraulic actuating system for an engine according to a second implementation of the present invention. The engine according to this implementation includes, per one cylinder or one cylinder of a plurality of cylinders, separate hydraulic actuating systems for actuating intake and exhaust valves 11 and 12. It is noted that the hydraulic actuating system for the exhaust valve 12 is not described in this embodiment because it is substantially the same as the hydraulic actuating system for the intake valve 11. A hydraulic control valve 30E3 according to this implementation is described using like reference numerals to denote like or similar parts or portions to those of the hydraulic control valve 30 according to the first implementation.

The hydraulic control valve 30B according to this implementation is different from the hydraulic control valve 30 according to the first implementation in that it selects one of two events, one event in which an input passageway 24 is allowed to communicate with an output passageway 25, the other event in which the former is not allowed to communicate with the latter, in every other rotation of an intake cam 19 and selects the other in an adjacent rotation of the intake cam 19.

(Construction of Hydraulic Control Valve)

Similarly to the first implementation, a hydraulic control valve 30B is built in a hydraulic actuating unit 15. As shown in FIGS. 7 and 8, the hydraulic control valve 30B includes a solenoid 31, a cylinder portion 32 filled with engine oil and a spool 33 actuated by the solenoid 31 to move back and forth in the cylinder portion 32.

As shown in FIGS. 7 and 8, the hydraulic control valve 30B is connected in a way that its port 32A, located in the middle position between the central portion and the remote end 32F from the solenoid 31 with respect to the axial direction of the cylinder portion 32, communicates with an input hydraulic chamber 21 through an input passageway 24.

The hydraulic control valve 30B is connected in a way that an output hydraulic chamber 17 for a cylinder 8 communicates, through an output oil passage 25, with a cylinder portion 32 at a port 32B. The port 32B is positioned at almost the central position of the cylinder portion 32 with respect to its axial direction. A port 32D is positioned near to the solenoid 31 more than the port 32B is. The port 32E is positioned near to the end 32F of the cylinder portion 32 more than port 32A is.

As shown in FIGS. 7 and 8, the spool 33 is in the form of a rod, and it is formed with lands 34, 35 and 36 which are arranged at predetermined intervals in this order from the side of the solenoid 31. The land 36 is in a distal end region of the spool 33. In a rest state or position illustrated in FIG. 7 in which the spool 33 has been pulled back by the solenoid 31 (the state in which the spool 33 has moved to the left viewing in FIG. 7), a space defined by a port recess between the lands 34 and 35 is allowed to communicate with the port 32D connected to the passageway 39A, a space defined by a port recess between the lands 35 and 36 is allowed to communicate with the port 32A connected to an input passageway 24 and the port 32B connected to an output passageway 25, and a space defined between the land 36 and the end 32F of the cylinder portion 32 is allowed to communicate with the port 32E connected to the passageway 39B. In this state, a distance L between the land 36 and the end 32F of the cylinder portion 32 becomes the length of a stroke of the spool 33.

In a state or position illustrated in FIG. 8 in which the spool 33 has been thrust to protrude by the solenoid 31 (the state in which the spool 33 has moved to the right viewing in FIG. 8), the space defined by the port recess between the lands 34 and 35 provides communication between the port 32B connected to the output passageway 25 and the port 32D connected to the passageway 39A, the space defined by the port recess between the lands 35 and 36 is allowed to communicate with the port 32A connected to the input passageway 24 and the port 32B connected to the passageway 39B.

The solenoid 31 is controlled so that the spool 33 assumes one of the two positions illustrated in FIG. 7 and FIG. 8 in every other rotation of the intake cam 19 and the other in an adjacent rotation of the intake cam 19. In other words, the hydraulic control valve 30B is designed to assume alternately a first state in which the input passageway 24 is allowed to communicate with the output passageway 25 for the cylinder 8 (the illustrated state in FIG. 7) and a second state in which the input passageway 24 is allowed to communicate with the oil passageway 39B (the illustrated state in FIG. 8) during at least one two-stroke cycle of the input piston 22 beginning with the moment when the input piston 22 begins to move in a direction reducing the volume of the input hydraulic chamber 21 (i.e. in a direction toward the input oil passage 24) and ending with the moment when the input piston 22 returns to its rest position.

In the other parts or portions of the construction, the hydraulic control system according to this implementation is the same as the hydraulic control system according to the first implementation.

(Operation and Effect)

Next, operation of the engine 1 according to this embodiment is described. When the intake valve 11 for the cylinder 8 is to be lifted, the spool 33 of the hydraulic control valve 30B is pulled by the solenoid 31 to a position in which the land 34 is in the neighborhood of the end 32G of the cylinder portion 32. The spool 33 keeps this position during the period of time when the intake cam 19 begins to make one rotation with bringing the base circle 19A into contact with the input piston 22 before the cam lobe 19B and ends the rotation with bringing the base circle 19A again into contact with the input piston 22 after the cam lobe 19B.

At this moment, as shown in FIG. 7, the ports 32A and 32B communicate with each other. In this state, hydraulic thrust caused by movement of the input piston 22 actuated by the intake cam 19 is transmitted through the input hydraulic chamber 21, intake passageway 24, cylinder portion 32, output passageway 25 and output hydraulic chamber 17 to thrust the output piston 18, thereby to lift the intake valve 11 of the cylinder 8 open once. In this time of period, the timing of opening the exhaust valve 12 of the first cylinder 8 is determined by another hydraulic control valve, not shown, based on the timing of the intake valve 11 controlled by the hydraulic control valve 30B.

During period (360° to 720° in crank angle degrees) when the intake cam 19 makes the next rotation, the spool 33 of the hydraulic control valve 30B is thrust by the solenoid 31 to the illustrated position of FIG. 8 in which the land 37 is in the neighborhood of the end 32F of the cylinder portion 32. During this period, the intake valve 11 of the cylinder 8 is kept closed because the cylinder 8 is in an expansion stroke and an exhaust stroke.

During this period, a hydraulic input produced by the action of the intake cam 19 to lift the input piston 22 is absorbed by the accumulator 38 through the input passageway 24, cylinder portion 32, passageway 39B and passageway 39 because the port 32A communicates with the port 32E. The valve spring 13 is stronger, in spring force, than the spring 45 of the accumulator 38. In other words, the spring 45 of the accumulator 38 is weaker than the valve spring 13 so that the accumulator 38 keeps hydraulic pressure within the passageway 39, passageway 39A, cylinder portion 32, output passageway 25 and output hydraulic chamber 17 low enough to keep the intake valve 11 closed during the lift action by the intake cam 19.

As stated above, each of the intake valves 11 of the cylinder 8 is lifted at regular interval of 720° in crank angle degrees only by selecting one of the two positions of the spool 33 of the hydraulic control valve 30B in every other rotation of the intake cam 19 and selecting the other position in an adjacent rotation of the intake cam 19. Therefore, the valve lift thrust is distributed to the intake valve 11 of one of the cylinders once in two revolutions of the crankshaft 7, providing the same operation as operation given by using the conventional camshaft which makes one rotation per two revolutions of the crankshaft 7.

The use of the hydraulic control valve 30B in this embodiment also has an advantage that no special timing accuracy is required because what is needed is on/off control of the solenoid 31 coupled to the spool 33 when the base circle portion 19A of the intake cam 19 is in contact with the input piston 22 (i.e. when there is no valve lift).

The engine according to this implementation provides the same operation and effect as those provided by the before stated engine 1 according to the first implementation. Therefore, this embodiment simplifies the valve actuating mechanism, leading to a reduction in weight of and an improvement in productivity of manufacture of engine 1.

(Other Implantations)

With regard to the preceding description of the implementations, it should not be understood that the statement and the drawings which make a part of the disclosure of the implementations limit the present invention. From this disclosure, various forms of alternative implementations, embodiments and operation technology may be clear to those skilled in the art.

For example, although the intake and exhaust cams 19 and 20 are directly coupled to the crankshaft 7 in the preceding various implementations, the intake and exhaust cams 19 and 20 may be coupled to a balancer that rotates at the same speed as the crankshaft 7. In this case, arranging the balancer above the crankshaft 7 shortens the input passageways 24 and improves valve actuating responsiveness.

Although, in the preceding various implementations, description was made on the engine in which each cylinder has only one intake valve 11 and only one exhaust valve 12, the invention may be implemented in an engine in which each cylinder has a pair of intake valves 11 and a pair of exhaust valves 12 only by dividing each output passage into two branches within a cylinder head portion 2 for connection to the intake or exhaust valves of each pair.

[Explanation of Notations]
1 engine
2 cylinder head portion
3 cylinder block portion
4 monoblock
7 crankshaft
8A first cylinder
8B second cylinder
11 intake valve
12 exhaust valve
13 valve spring
14 valve spring
15 hydraulic actuating unit
17 output hydraulic chamber
18 output piston
19 intake cam
19A base circle
19B cam lobe (nose part)
20 exhaust cam
21 input hydraulic chamber
22 input piston
23 spring
24 input passageway
25, 25A, 25B output passageway
30 hydraulic control valve
31 solenoid
32 cylinder portion
32A, 32B, 32C, 32D, 32E port
33 spool
34, 35, 36, 37 land
38 accumulator
39, 39A, 39B passageway
41 oil pump
42 passageway
43 accumulator chamber
44 accumulator piston
45 spring

The invention claimed is:

1. A four-stroke cycle engine comprising:
a valve biased by a valve spring toward its closed position, and
a hydraulic actuating system including:
an output hydraulic chamber within a cylinder head,
an output piston moveable backwards and forwards in said output hydraulic chamber for opening said valve against said valve spring,
an input hydraulic chamber facing an outer periphery of a crankshaft,
an input piston moveable backwards and forwards in said input hydraulic chamber arranged for driving said output piston via hydraulic fluid,
a cam coaxial with said crankshaft for actuating said input piston in a way that one rotation of said cam causes the input piston to move backwards and forwards once,
a hydraulic control valve,
an output passageway connecting said output hydraulic chamber to said hydraulic control valve, and
an input passageway connecting said input hydraulic chamber to said hydraulic control valve,
said hydraulic control valve including:
an output-enabling state, which enables pressure-transmission communication between said input passageway and said output passageway at least during a period for one cycle of reciprocating motion of the input piston beginning with the moment when, under action of said cam, said input piston begins to move from its rest position in a direction decreasing volume of said input hydraulic chamber and ending with the moment when said input piston subsequently returns to its rest position, and
an output-disabling state, which disables the pressure-transmission communication at least during the period for one cycle of reciprocating motion of said input piston,
said hydraulic control valve assuming one of said output-enabling state and said output-disabling state in every other rotation of said cam and the other in an adjacent rotation of said cam,
the four-stroke cycle engine further comprising a second valve biased by a second valve spring toward its closed position,
wherein said first mentioned valve and said second valve are an intake valve and an exhaust valve, and
wherein said hydraulic actuating system includes a first hydraulic actuating subsystem for controlling said intake valve and a second hydraulic actuating subsystem for controlling said exhaust valve.

2. The four-stroke cycle engine according to claim 1,
wherein said hydraulic actuating system includes a second cam,
wherein said first mentioned cam and said second cam are an intake cam for an input to said first hydraulic actuating subsystem for controlling said intake valve and an exhaust cam for an input to said second hydraulic actuating subsystem for controlling said exhaust valve, and wherein said intake cam and said exhaust cam are coaxial with said crankshaft.

3. A four-stroke cycle engine comprising:
a valve biased by a valve spring toward its closed position and
a hydraulic actuating system including:
an output hydraulic chamber within a cylinder head,
an output piston moveable backwards and forwards in said output hydraulic chamber for opening said valve against said valve spring,
an input hydraulic chamber facing an outer periphery of a crankshaft,
an input piston moveable backwards and forwards in said input hydraulic chamber arranged for driving said output piston via hydraulic fluid,
a cam coaxial with said crankshaft for actuating said input piston in a way that one rotation of said cam causes the input piston to move backwards and forwards once,
a hydraulic control valve,
an output passageway connecting said output hydraulic chamber to said hydraulic control valve, and
an input passageway connecting said input hydraulic chamber to said hydraulic control valve,
said hydraulic control valve including:
an output-enabling state, which enables pressure-transmission communication between said input passageway and said output passageway at least during a period for one cycle of reciprocating motion of the input piston beginning with the moment when, under action of said cam, said input piston begins to move from its rest position in a direction decreasing volume of said input hydraulic chamber and ending with the moment when said input piston subsequently returns to its rest position, and
an output-disabling state, which disables the pressure-transmission communication at least during the period for one cycle of reciprocating motion of said input piston,
said hydraulic control valve assuming one of said output-enabling state and said output-disabling state in every other rotation of said cam and the other in an adjacent rotation of said cam,
wherein said output passageway is allowed to communicate with an oil pump when said output passageway is disabled from making pressure-transmission communication with said input passageway.

* * * * *